United States Patent [19]
Levan

[11] Patent Number: 5,959,660
[45] Date of Patent: Sep. 28, 1999

[54] SUBCHANNELIZATION SCHEME FOR USE IN A BROADBAND COMMUNICATIONS SYSTEM

[75] Inventor: William Levan, San Jose, Calif.

[73] Assignee: Hybrid Networks, Inc., San Jose, Calif.

[21] Appl. No.: 08/702,932

[22] Filed: Aug. 26, 1996

[51] Int. Cl.⁶ .................................................. H04N 7/10
[52] U.S. Cl. ............................ 348/12; 370/485; 455/5.1
[58] Field of Search ........................... 348/6, 7, 10, 11, 348/12, 13, 384, 388, 389, 469, 487; 455/6.1, 6.2, 6.3, 3.1, 3.2, 4.2, 5.1; 375/260, 261, 259, 334, 340, 339; 370/485, 486

[56] References Cited

U.S. PATENT DOCUMENTS

| 4,805,014 | 2/1989 | Sahara et al. . | |
|---|---|---|---|
| 4,893,316 | 1/1990 | Janc et al. | 375/261 |
| 4,937,821 | 6/1990 | Boulton . | |
| 5,243,629 | 9/1993 | Wei . | |
| 5,351,234 | 9/1994 | Beierle at al. | 370/485 |
| 5,477,199 | 12/1995 | Montreuil . | |
| 5,586,121 | 12/1996 | Moura et al. . | |
| 5,594,726 | 1/1997 | Thompson et al. | 348/12 |
| 5,619,251 | 4/1997 | Kuroiwa et al. | 348/734 |
| 5,629,736 | 5/1997 | Haskell et al. | 348/387 |

*Primary Examiner*—Victor R. Kostak
*Attorney, Agent, or Firm*—Kile McIntyre & Harbin

[57] ABSTRACT

An apparatus and method for subchannelizing a wide band data channel into plural narrow band subchannels. In particular, the apparatus and method functioning so as to subchannelize a standard television channel to permit data transfer over plural data channels of smaller bandwidth in a full-duplex, asymmetric hybrid network communication system.

42 Claims, 9 Drawing Sheets

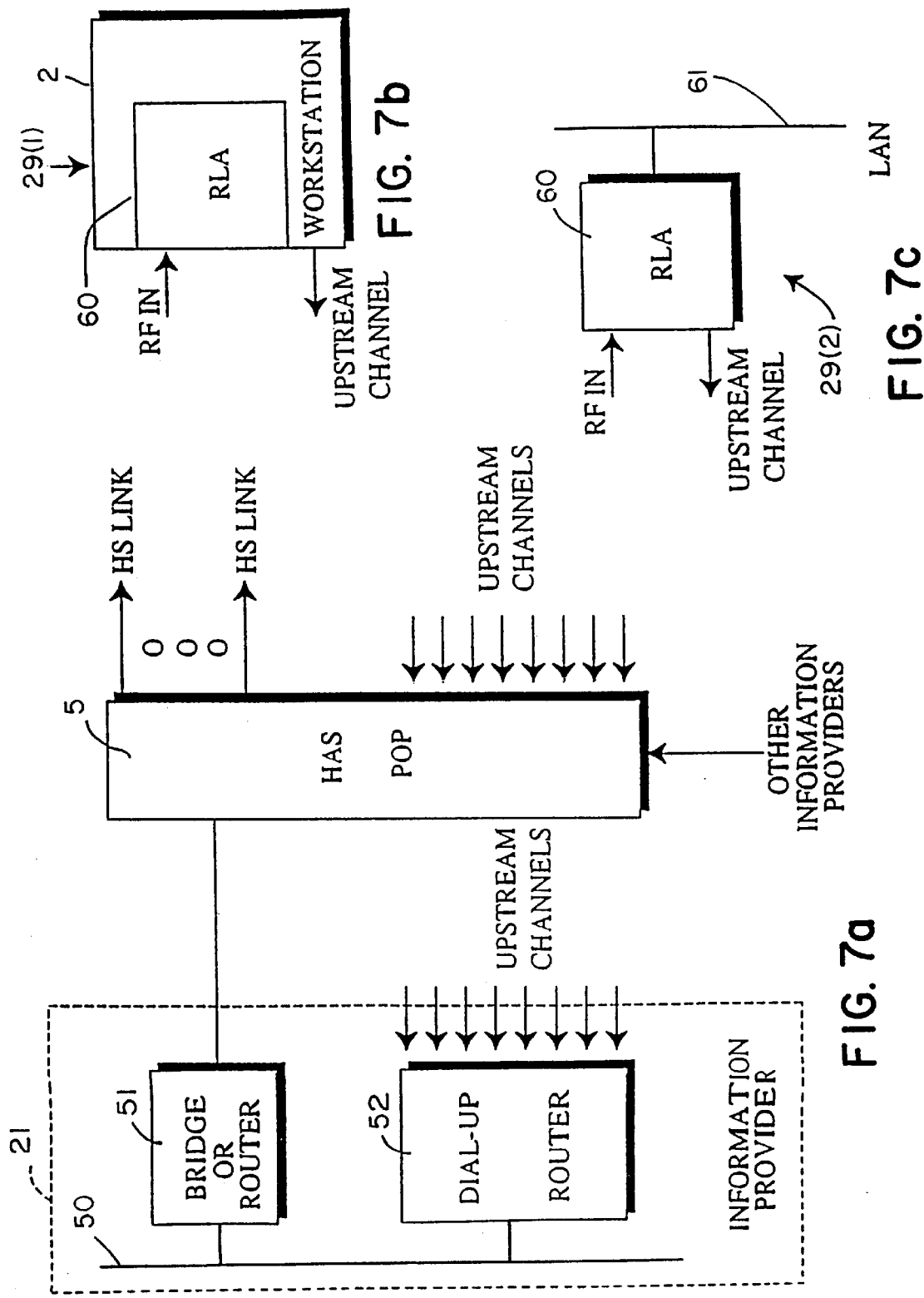

SUBCHANNELIZATION SCHEME FOR USE IN A BROADBAND COMMUNICATIONS SYSTEM

The present invention relates generally to subchannelization schemes in which a wide band data channel is segmented into plural narrow band subchannels, and more particularly, a method and apparatus for subchannelizing a standard television channel to permit data transfer over plural data channels of smaller bandwidth in a full-duplex, asymmetric hybrid network communication system.

BACKGROUND ART

The use of a television channel carrier signal in a communication network for the transmission of digital data is known. A cable modem, for example, is one application of this technology. However, the transmission of high speed digital data over a single television channel leaves the data carried on that channel very susceptible to interference and other noise which tend to degrade the quality of data being transmitted. Moreover, the data rate of a network receiving such transmissions does not necessarily match the maximum available data rate of the television channel and thus special hardware may be required to efficiently utilize the full bandwidth. Due to the proliferation of the Internet and intranets and an ever increasing demand for higher data throughput by client devices connected to such networks, methods and apparatuses for increasing quality throughput and reducing error rates are desirable.

SUMMARY OF THE INVENTION

The present invention provides a method and apparatus for increasing the quality throughput of data transmitted in a network over a standard television channel and for providing an efficient scheme for subdividing the television channel into plural subchannels of data rates that match the data rate of the network to which client devices are connected. By subdividing a standard television channel one can reduce the overall effect of noise ingress, near-end cross talk, intermodulation, and sensitivity to frequency response on the client devices receiving data over the television channel.

It is thus an object of the present invention to reduce the effect of noise ingress on clients receiving data in a network over a standard television channel.

A further object of the present invention is to reduce the effect of near-end cross talk on clients receiving data in a network over a standard television channel.

Another object of the present invention is to reduce the effect of intermodulation on clients receiving data in a network over a standard television channel.

A further object of the present invention is to reduce the effect of sensitivity to frequency response variations on clients receiving data in a network over a standard television channel.

A further object of the present invention is to improve the bit error rate of standard television channels used for transmission of digital data.

A further object of an embodiment of the present invention is to provide a data subchannel of a standard television channel whose throughput is approximately equal to the Ethernet 10 Mbit/sec standard.

BRIEF DESCRIPTION OF THE DRAWINGS

These and other objects and advantages of this invention will become more apparent and more readily appreciated by reference to the description of the preferred embodiments, taken in conjunction with the accompanying drawings, of which:

FIGS. 7a, b and c are block diagrams of a hybrid access system depicting upstream channels and high speed downstream links to respective client devices in which an embodiment of the present invention is employed.

DETAILED DESCRIPTION OF PREFERRED EMBODIMENTS

The present invention will be better understood by reference to the accompanying drawings.

Figure 1:
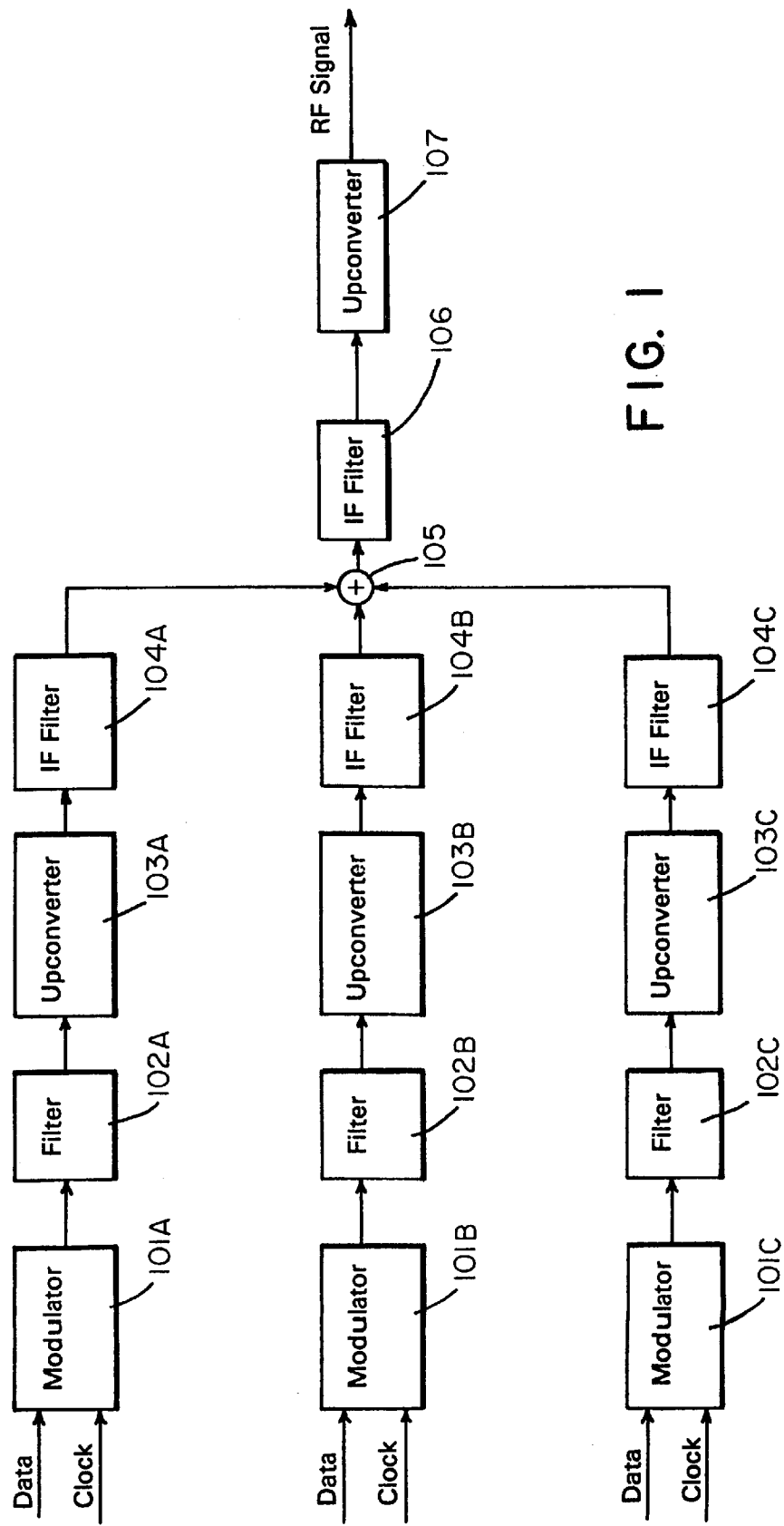
FIG. 1 is a block diagram of a channel divider according to an embodiment of the present invention.

FIG. 1 depicts a three-way channelizer in which a broadband television channel (6 Mhz wide in the United States) is subdivided into three 2 Mhz data channels. The channelization schemes may also be altered to accommodate 8 Mhz channels utilized in Europe and elsewhere. As shown, three digital data serial streams, each of preferably about 10 Mbits/sec, e.g., a conventional 10BaseT LAN data rate, are input into three modulators 101A–C. Preferably, the modulators use a common clock to modulate three data input streams by quadrature amplitude modulation (QAM). Other forms of modulation, such as vestigial side band (e.g., 4 VSB or 8 VSB modulation), may be used. 64 QAM modulation, however, provides a data throughput of about 1.536 or 1.648 megasymbols per second per subchannel.

After modulation, each of the modulated data streams are low pass filtered by filters 102A–C. Filters 102A–C are preferably elliptically-shaped Butterworth filters having 7 or 9 poles and a cut-off frequency of about 2.5 MHz.

The three filtered signals are then upconverted in upconverters 103A–C using conventional techniques. In the case of 64 QAM modulation, the upconverters 103A–C upconvert the signals to intermediate frequency (IF) signals centered about 42 MHz (subchannel A), 44 MHz (subchannel B) and 46 MHz (subchannel C), respectively. The reason that the data streams are modulated and later upconverted is that present circuit limitations prevent direct modulation using 64 QAM. It is to be understood that the scope of the present invention does not exclude direct QAM modulation to intermediate frequencies (IF) for further conditioning and processing by standard television components.

The resulting IF signals are then filtered by IF filters 104A–C. Preferably the IF filters 104A–C are 2 MHz wide surface-acoustic-wave (SAW) filters.

The resulting signals on the respective channels are then combined in adder 105 and again IF filtered by IF filter 106. The output of IF filter 106 is supplied to upconverter 107 where the IF composite signal is upconverted again using techniques common to standard television signals.

Figure 2:
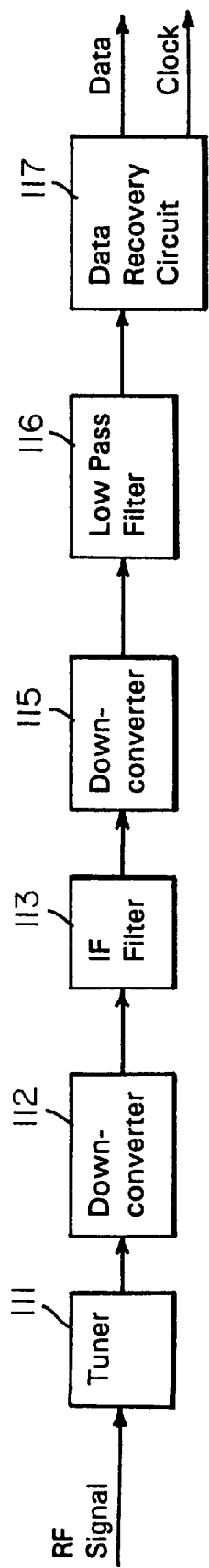
FIG. 2 is a block diagram of a data recovery device according to an embodiment of the present invention.

Referring now to the data recovery circuit of FIG. 2 located at a receiving end of a data transmission, it is seen that data received from the network flows to a client over a specific subchannel. The particular subchannel is defined by the tuned frequency of tuner 111. The incoming RF signals are supplied to the tuner 111 in which a specific 2 Mhz television subchannel frequency is selected (or tuned). For instance, tuner 111 may tune to the RF frequency of 55 MHz, representing subchannel A of television channel 2. That signal is then downconverted to an IF frequency centered at 44 MHz in downconverter 112 and run through an IF filter 113, preferably one matching IF filters 104A–C in FIG. 1.

The filtered signal is then downconverted at downconverter 115 to baseband and filtered again at filter 116 preferably using a filter matching filters 102A–C used on the modulating end. The digital data is then recovered from the baseband signal in data recovery circuit 117 using conventional techniques such as baseband sampling at four, eight or sixteen times the symbol rate.

Figure 3:
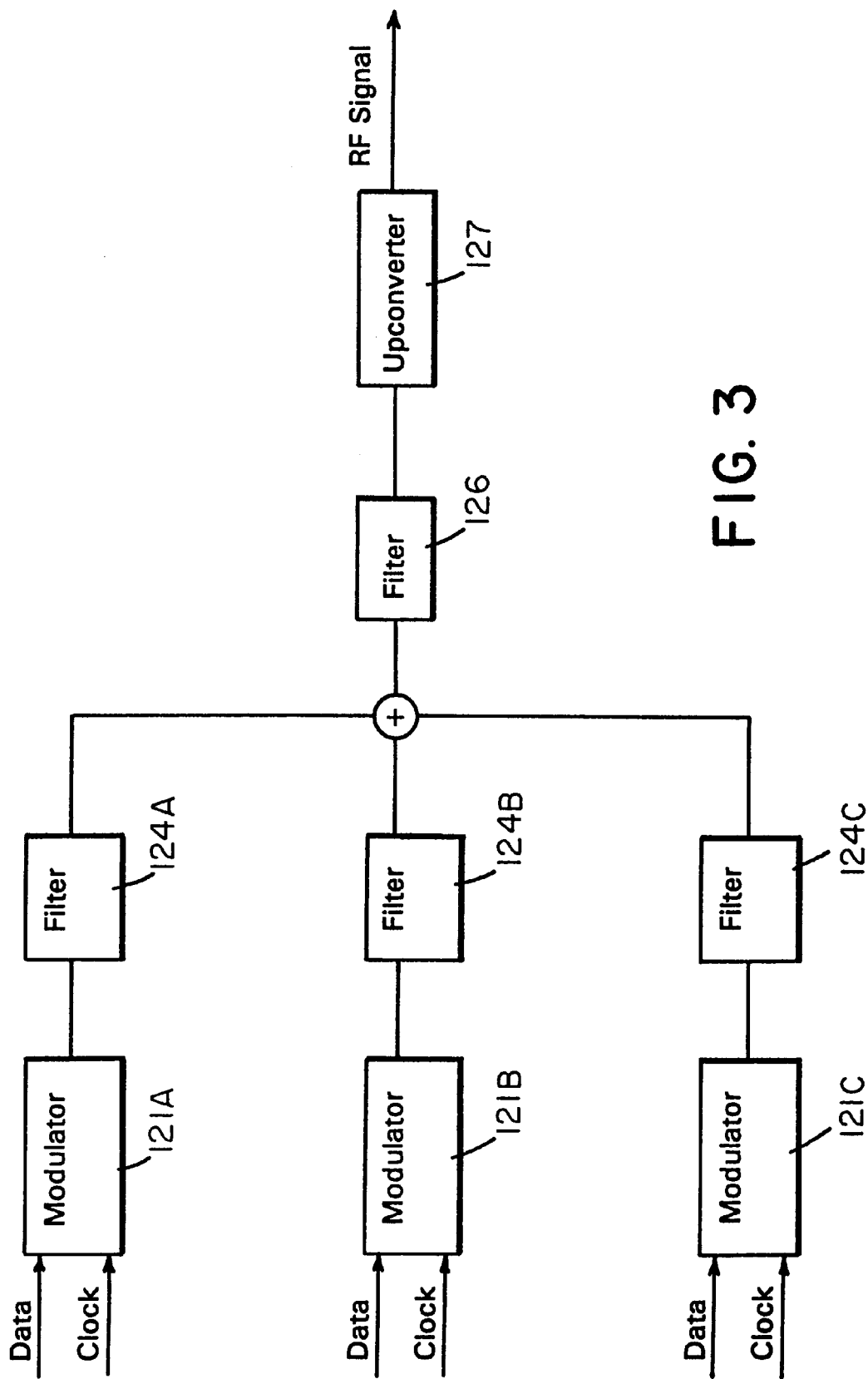
FIG. 3 is a block diagram of a channel divider according to another embodiment of the present invention.

In FIG. 3, under another embodiment of the present invention, three digital data serial streams preferably each utilizing the same clock signal, are input into three modulators 121A–C. These modulators 121A–C vestigial sideband modulate (VSB) the three input data streams by carriers of 42.950 MHz, 44.950 MHz and 46.950 MHz, respectively. Preferably, 4 VSB is utilized. However, any other acceptable form of modulation may be used.

The resulting IF signals are then IF filtered in IF filters 124A–C. Preferably the IF filters 124A–C are 2 MHz wide surface-acoustic-wave (SAW) filters.

The resulting signals are then combined in adder 125 and again IF filtered in IF filter 126. The output of IF filter 126 is fed to upconverter 127 where the IF composite signal is upconverted again using conventional techniques to a common television channel carrier frequency.

Figure 4:
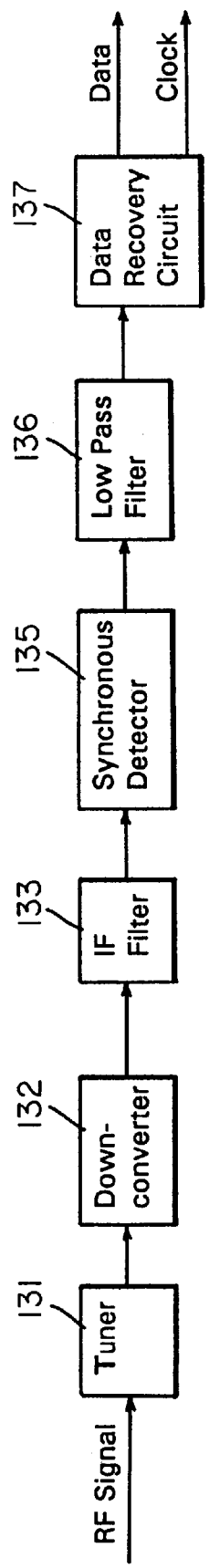
FIG. 4 is a block diagram of a data recovery device according to another embodiment of the present invention.

Referring now to FIG. 4, on the receiving end the data then flows to a client over a specific subchannel. The incoming RF signals are fed into a tuner 131 in which a specific television subchannel frequency is selected. That signal is then downconverted to an IF frequency centered at 44 MHz in downconverter 132 and run through an IF filter 133, preferably one matching IF filters 124A–C in FIG. 3.

The filtered signal is then fed to synchronous detector 135 followed by low pass filter 136. Filter 136 is preferably an elliptically-shaped Butterworth filter with 7 or 9 poles and a cut-off frequency of about 2.5 MHz. The digital data is then recovered from the baseband signal in data recovery circuit 137 using conventional techniques, such as sampling at two times the symbol rate.

It is to be understood that data may be transmitted from a client to a television headend facility utilizing a television subchannel as well by modulating (as described above) a single data bit stream for transmission over a subchannel frequency.

Figure 5:
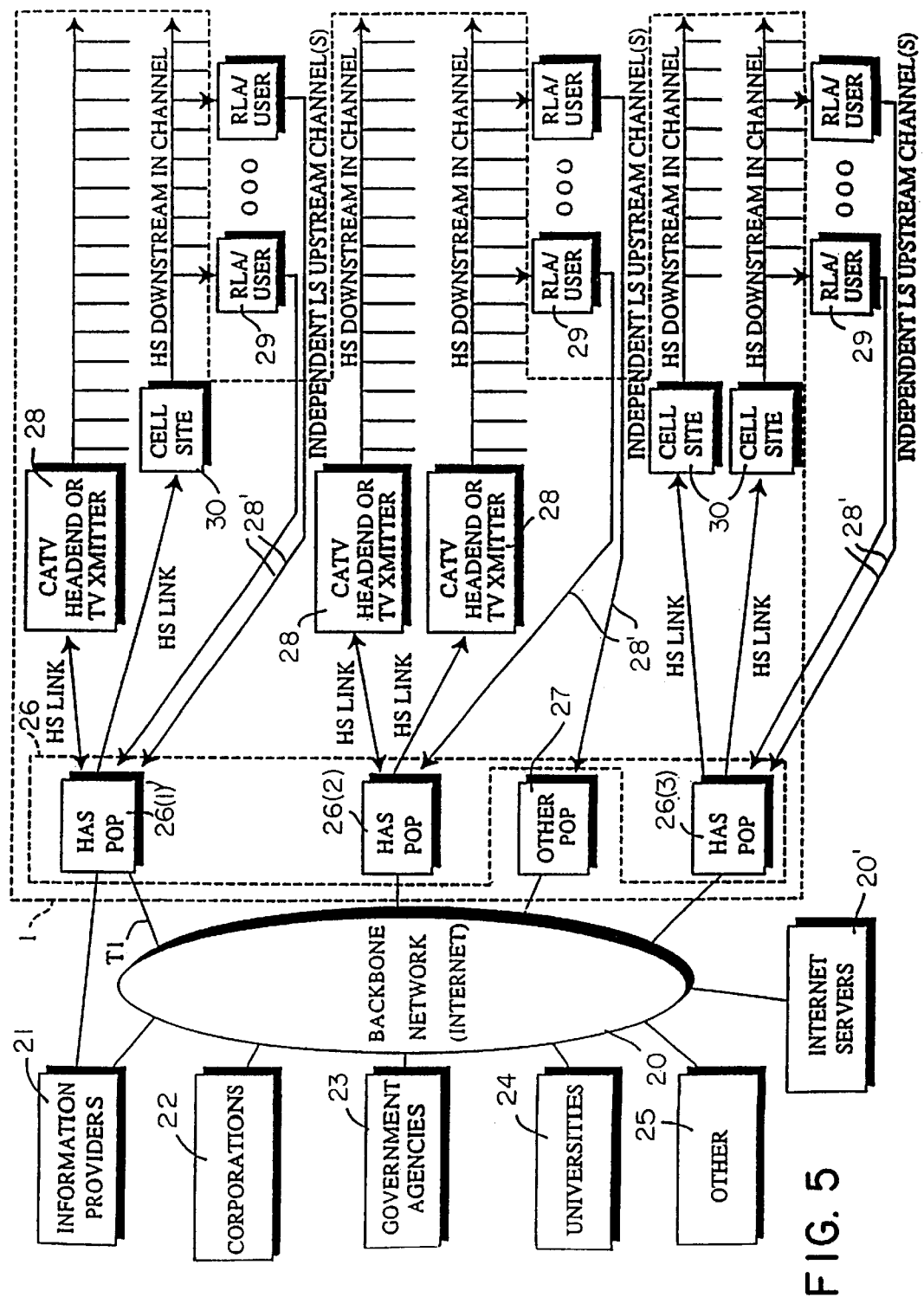
FIG. 5 is a block diagram of a hybrid access system in which the channelizer of the present invention may be employed.

FIG. 5 is a detailed schematic drawing of a hybrid access system 1 in which the subchannelizer and data recovery device is employed respectively at the cable television headend 28 and a the remote link adapters 29 in order to permit subdividing a standard 6 Mhz channel transmitted from headend 28 into three 2 Mhz subchannels that are conveyed over a high speed downstream channel to plural remote like adapters 29. FIG. 5 shows a remote link adapter (RLA) and client workstation 29 connected through hybrid access system 1 to a variety of entities connected to a backbone network 20 such as Internet, including information providers 21, corporations 22, government agencies 23, universities 24, and others 25. A backbone network is one which is typically not directly connected to a client. Hybrid access system 1 includes hybrid access system (HAS) points of presence (POPs) 26 and other points of presence 27. HAS POPs 26 include individual HAS POPs 26 (1)–26(3) which enable communication over a broadband network, either by upstream and downstream cable communications or by downstream cable and upstream telephone communications or various other hybrid configurations (e.g., wireless or satellite). A hybrid access system utilizing the present invention may include: (1) a hybrid access configuration which uses downstream cable television subchannels and upstream public switch telephone network (PSTN), wireless RF communications or integrated services digital network (ISDN) telephone lines; (2) a hybrid access configuration which uses downstream wireless television subchannels and upstream public switch telephone network (PSTN), wireless RF communications or integrated services digital network (ISDN) telephone lines; (3) a hybrid access configuration which uses both downstream and upstream cable television subchannels; (4) a hybrid access configuration which uses both downstream and upstream wireless television subchannels; and (5) a hybrid access configuration with downstream satellite television subchannels and upstream PSTN, wireless RF communications or ISDN telephone channels.

Backbone network 20 such as the Internet which includes a plurality of Internet serves 20 connected to HAS POPs 26 each including a plurality of host computers and/or servers, collectively referred to as hybrid servers. Hybrid access system 1 further includes broadcast units such as, a cable television headend 28, independent upstream channels 28, and RLA 29. U.S. Pat. No. 5,347,304 (1994) assigned to Hybrid Networks, Inc., describing an example of an RLA, is hereby expressly referenced and incorporated herein in its entirety. An RLA may receive analog broadcast signals including encoded digital information which the RLA decodes and provides to a data terminal or computer. According to an embodiment of the present invention, the downstream flow of information proceeds from HAS POPs 26(1)–26(3) through cable television headend or television transmitters 28 through television subchannels or cell sites 30 and through RLA and client workstation 29. Upstream information flow proceeds in one case from RLA and client workstation 29 through independent upstream channels 28 to HASPOP 26(1) and then to backbone network 20 along T1 or T3 or other digital lines. In another case, upstream information proceeds from client workstation through RLA 29 through the cable television network, and cable television headend 28 to hybrid access system point of presence and then through T1, T3, or other digital lines to backbone network 20. The outputs of the cable television headends or television transmitters 28 include pluralities of high speed downstream broadband radio frequency (RF) subchannels connected to respective remote clients 29. Hybrid access system 1 further includes a plurality of cell sites 30 connected through high speed links to a corresponding hybrid access system point of presence 5. The outputs of cell sites 30 include pluralities of high speed downstream broadband subchannels connected to selected remote clients 29. A particular remote client 29 can be connected via an independent lower speed upstream channel to a hybrid access system point of presence 26 as discussed below or via a similar independent lower speed upstream channel to another point of presence system 27. By lower speed it is meant as a speed reduced from the speed of the high speed link used to transmit information downstream. A particular hybrid access system point of presence 5 can be connected via duplex high speed links to a plurality of cable television headends or television transmitters, to a plurality of cell sites 30, or a combination of cable television headends or television transmitters 28 and cell sites 30.

Figure 6A:
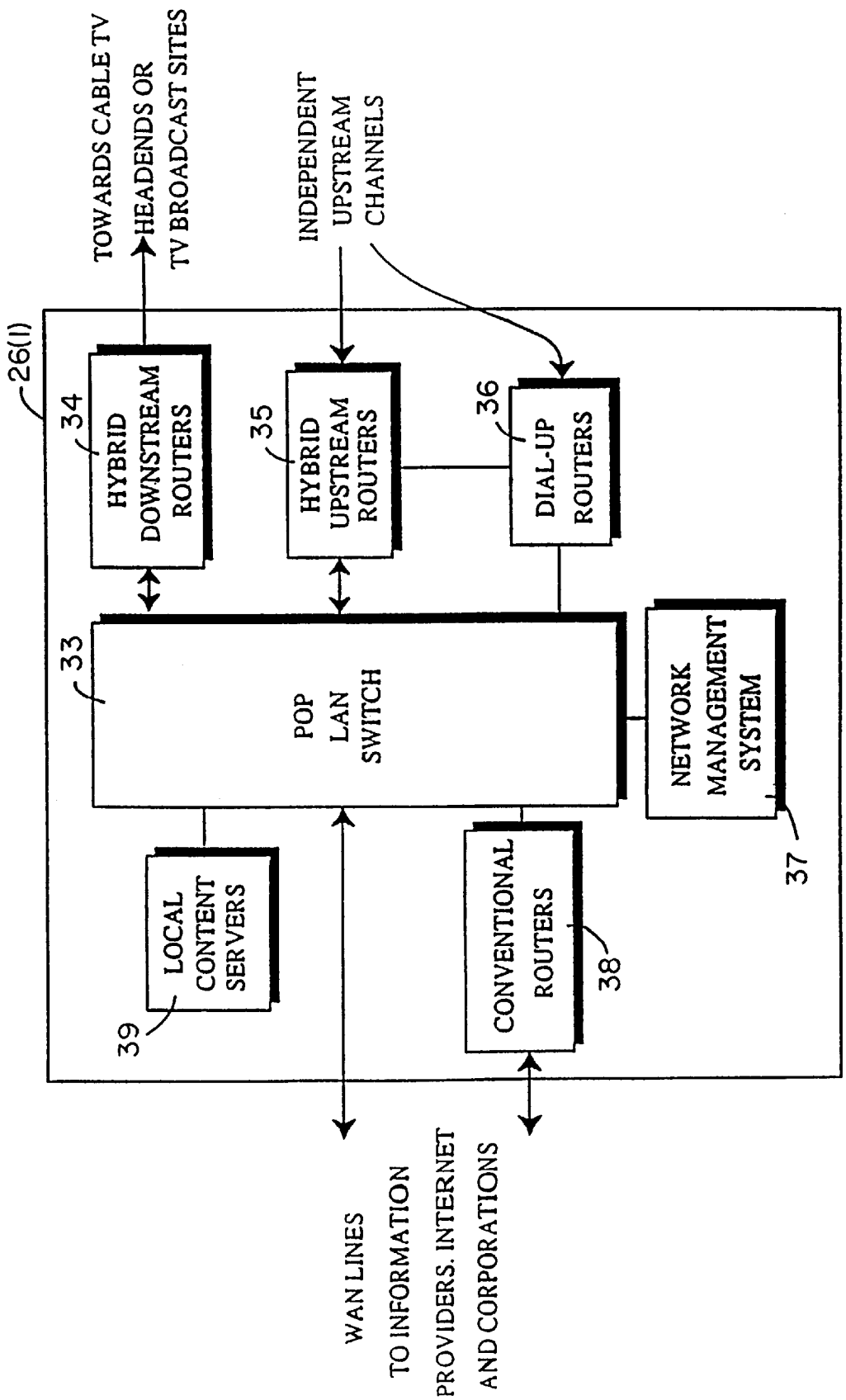
FIG. 6a is a block diagram of a hybrid access system point of presence (POP) in which the channelizer of the present invention may be employed.

FIG. 6a is a schematic drawing of a point of presence (POP) system 26(1) according to the present invention, including host computers or servers 39 and a POP local area network, i.e., LAN switch 33 to which host computers or servers 39 are connected. Further connected to LAN switch 33 are one or more downstream and one or more upstream hybrid access system point of presence routers, respectively 34 and 35, one or more dial-up routers 36, a network management system 37, and conventional routers 38. Connected to POP LAN switch 33 are one or more data storage elements or systems (not shown). Each downstream hybrid access system point of presence router 34 is connected with a high speed link to a television transmitter or cable television headend for transmission of data over television subchannels, for example. Further, each upstream hybrid access system point of presence router 35 is connected to a plurality of independent upstream channels, which operate at a lower speed than the downstream high speed links to television transmitters or cable television headends. Each dial-up router 36 is connected to a plurality of independent upstream channels operating at a lower speed than the indicated downstream high speed links. Each conventional router 38 is connected along a high speed line to wide area network (WAN) lines to selected information providers, Internet, or other nodes or businesses. POP LAN switch 33 may be connected directly along a high speed line to wide area network (WAN) lines to selected information providers, Internet, or other nodes or businesses.

Figure 6B:
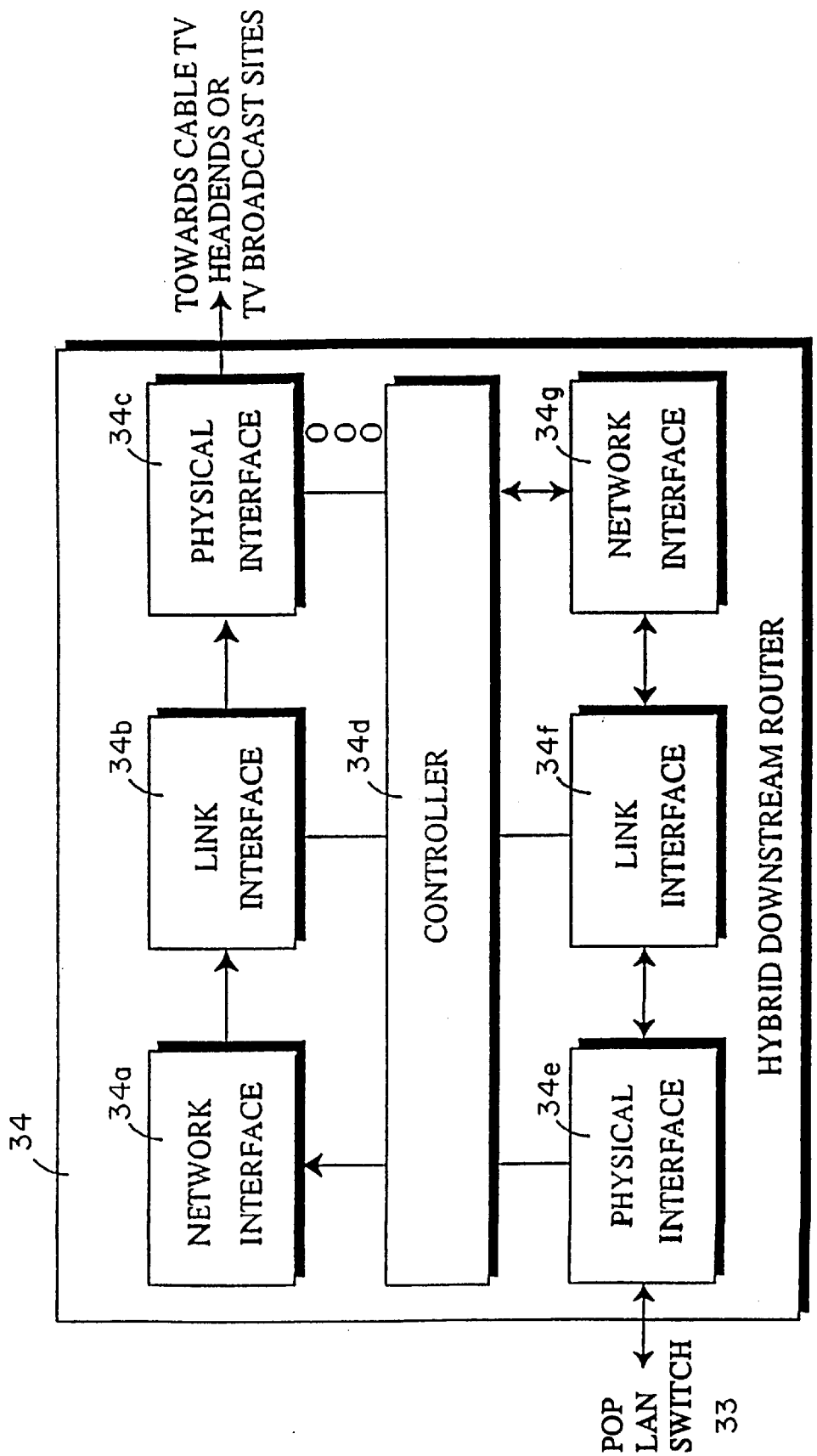
FIG. 6b is a block diagram of a downstream router.

FIG. 6b is a block diagram of hybrid downstream router 34 for use with the present invention. In particular, downstream router 34 includes network interface 34a, link interface 34F, and network interface 34g. Downstream router 34 and physical interface 34e are connected to POP LAN switch 33 for sending and receiving information, and physical interface 34e, link interface 34f, and network interface 34g are serially connected to each other and to controller 34d for bi-directional communication of selected information. Additionally, controller 34d is connected directly to each of physical interface 34e and link interface 34f along indicated lines to accomplish control and messaging functions. Downstream router 34 and physical interface 34c are connected to cable television headends, television broadcast sites, cell cites or the like, to communicate information primarily or exclusively in a unidirectional or downstream direction over television subchannels, and physical interface 34c, link interface 34b, and network interface 34a are serially connected to each other and to controller 34d for selected communication of selected information. Additionally, controller 34d is connected directly to each of physical interface 34c and link interface 34b along indicated lines to accomplish control and messaging functions. Downstream router 34 may include one or more of physical interfaces 34c. Router 34 may be a bridge without network interfaces 34a and 34g or a connection without network interfaces 34a and 34g and without link interfaces 34b and 34f. Router 34 can also be a gateway.

Figure 6C:
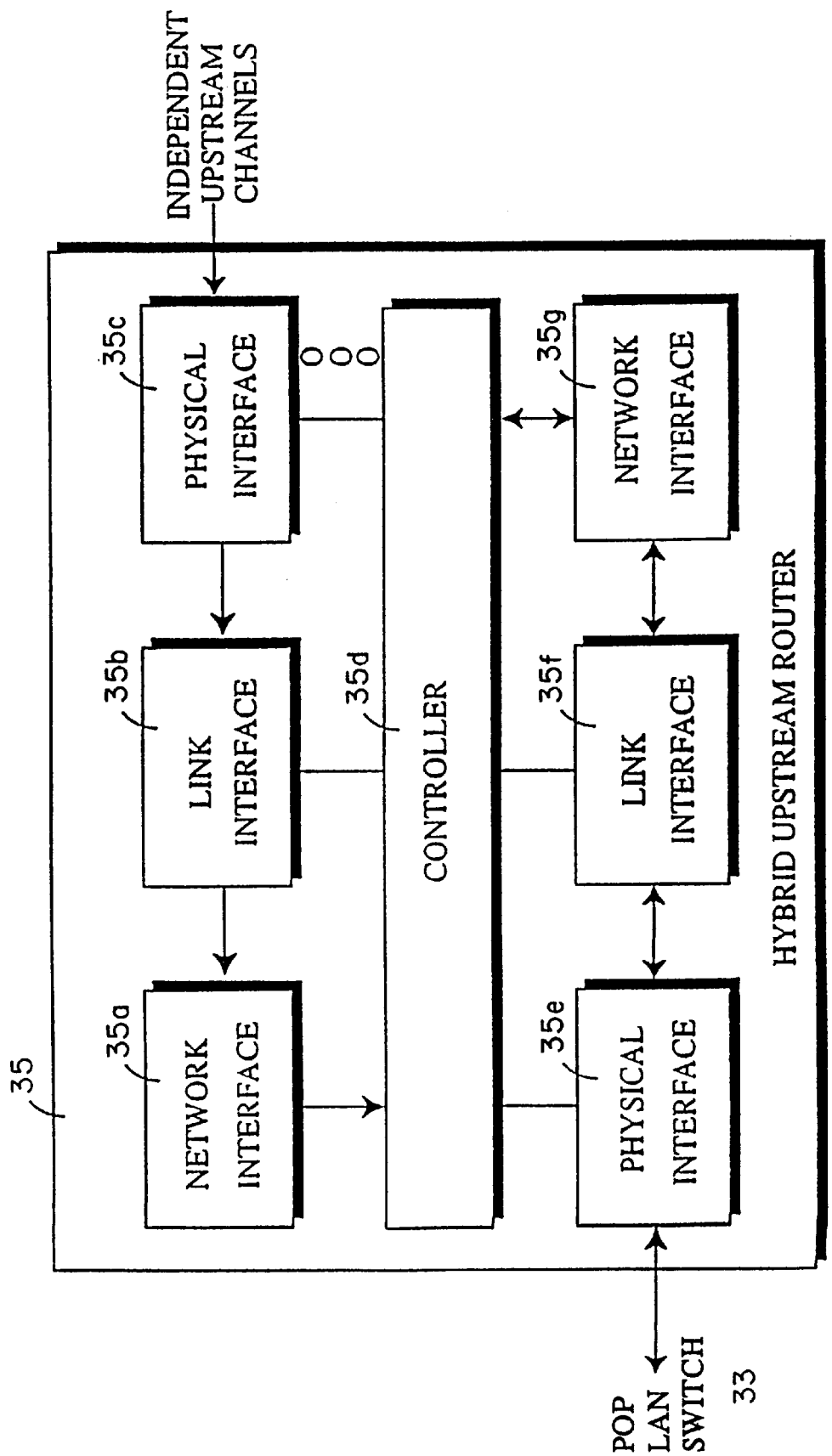
FIG. 6c is a block diagram of an upstream router.

FIG. 6c is a block diagram of upstream router 35 for use with the present invention. In particular, upstream router 35 includes network interface 35a, link interface 35b, physical interface 35c, controller 35d, physical interface 35e, link interface 35f, and network interface 35g. Upstream router 35 and physical interface 35e are connected to POP LAN switch 33 for sending and receiving information, and physical interface 35e, link interface 35f, and network interface 35g are serially connected to each other and to controller 35d for bi-directional communication of selected information. Additionally, controller 35d is connected directly to each other physical interface 35e and link interface 35f along indicated lines to accomplish control and messaging functions. Upstream router 35 and physical interface 35c are connected to upstream channels, e.g. telephone links for example, to communicate information primarily or exclusively in a unidirectional or upstream direction, and physical interface 35c, link interface 35b, and network interface 35a are serially connected to each other and to controller 35d for selected communication of selected information. Additionally, controller 35d is connected directly to each of physical interfaces 35c and link interface 35b along indicated lines to accomplish control and messaging functions. Upstream router 35 may include one or more of physical interfaces 35c. Router 35 may be a bridge without network interfaces 35a and 35g or a connection without network interfaces 35a and 35g and without link interfaces 35b and 35f. Router 35 can also be a gateway.

FIGS. 7a–c are drawings of a hybrid access system 1 in which a remote client having a workstation 2 is connected to LAN 61, as shown respectively in FIGS. 7b and 7c, can communicate with a selected information provider 21 including LAN 50, bridge or router 51 connected to LAN 50, and dial-up router 52 connected to LAN 50 through a hybrid access system point of presence 5. Further, HAS POP 5 is connected along a high speed link to bridge or router 51. Additionally, HAS POP 5 is linked to other information providers to receive selected information items. Furthermore, dial-up router 52 is connected to a plurality of upstream channels. FIG. 7b and 7c additionally show respective first and second clients, in one case including workstation 2 which includes RLA 60 and in the other instance including RLA 60 and a local area network (LAN) 61 connected to RLA 60. First client 29(1) is connected to an upstream channel from client workstation 2, and second client 29(2) is connected to an upstream channel directly from RLA 60. In the case of each client, RLA 60 receives input information, particularly radio frequency (RF) information along one of respective input subchannels connected thereto.

By utilizing the present invention, the effects of channel impairments on a television channel utilized for transfer of high speed digital data can be dramatically improved. Without the use of the invention, channel impairments such as noise ingress, near-end cross talk, composite intermodulation, and poor frequency response can severely restrict the usable throughput on a channel.

Testing has shown significant improvements through the use of the present invention. However, it is to be understood that use of subchannels requires the use of more filters at the modulating end and thus a slight loss in overall throughput. Although there is this minor loss of throughput for use of the present invention, there is a tremendous gain in performance.

For instance, noise ingress tends to have a narrow band effect. By dividing a wider spectrum into plural subchannels, the ingress affects one of the subchannels rather than the entire channel. Thus, a smaller number of clients will have their performance degraded by ingress. Similarly, the effects of near-end cross talk are reduced. Near-end cross talk interference, which appears as a continuous wave (CW) interferer, will also fall within one subchannel. Furthermore, sensitivity to intermodulation, such as the composite second order or the composite triple beat, caused by nonlinearity in distribution amplifiers is improved. By dividing a wider broadband channel into plural broadband subchannels, the main intermod impact is also placed in one of the subchannels.

Preferably the same IF filter that would be utilized for data on a channel is utilized for data on the subchannel. If the same filter is utilized, the filter effectiveness will be increased by the ratio of the channel size to the subchannel size. Thus, if a 6 MHz channel was divided into 2 MHz subchannels, the filter effectiveness would be increased threefold. This increase in effectiveness will yield better channel shaping and more effective cancellation of channel impairments. So not only would a smaller number of clients be affected by the channel impairments due to the containment of the impairments within single subchannels, the channel impairments would be better canceled.

Another benefit of the use of subchannels is that the data rate approximately matches the 10 Mbit/sec standard Ethernet data rate. If subchannels are not used, special cards are needed to create a 30 Mbit/sec network.

Although the examples and embodiments discussed herein utilize a 6 MHz television channel being broken down into three 2 MHz subchannels, any standard television channel could be subdivided (such as a European 8 MHz channel) and can be subdivided into any size subchannel. Furthermore, subchannels need not be of uniform bandwidth. For example, a 6 MHz channel could be broken down into a 4 MHz subchannel and a 2 MHz subchannel. Additionally, all channels do not need to be subdivided into subchannels.

EXAMPLES

A test was conducted in which a bit error rate tester was connected to a 64 QAM modulator. A 30 Mbit/sec digital data stream was then passed through the modulator and upconverted to an RF signal. The RF signal was then downconverted and demodulated at a simulated client. Bit errors in the range of 1×10-5 were experienced. The bit error rate tester was then connected to a channel divider utilizing 64 QAM according to the present invention. Three data streams of 10 Mbit/sec each were then fed into the respective inputs of the channel divider according to the present invention (as shown in FIG. 1) and one of those bit streams was recovered at a simulated client (as shown in FIG. 2). This test was repeated for each of the three data streams. Under this test of the utilization of subchannels, bit errors in the range of 1×10-8 were experienced.

The same tests were repeated utilizing 4VSB for the modulation scheme (as shown in FIGS. 3 and 4) with similar results. Thus, a dramatic improvement in bit error rate was achieved through the use of the present invention.

We claim:

1. In a network communication system having a plurality of servers, a communication line coupled to said plurality of servers, a television channel, and a plurality of clients that receive digital signals from the plurality of servers, each client coupled to said television channel, a circuit adapted for coupling to said communication line, said circuit comprising:

a plurality of modulators, each modulator having a modulator input that receives a respective digital signal from the plurality of servers, and a modulator output, each modulator modulating to generate a respective modulated signal on said output;

a radio frequency converter having a converter input, coupled to said modulator output of one of said modulators, said converter converting to generate an RF signal associated with a subchannel in said television channel, the subchannel carrying digital signals at a rate approximating the rate of an Ethernet connection.

2. A circuit as in claim 1, wherein said subchannel is approximately 2 MHz in bandwidth.

3. A circuit as in claim 1, wherein a bit rate of one of said respective digital signals is approximately 10 Mbits/sec.

4. A circuit as in claim 1, wherein one of said plurality of modulators includes circuitry that processes said corresponding digital signal with quadrature amplitude modulation.

5. A circuit as in claim 4, wherein said radio frequency converter comprises:

a first plurality of upconverters for upconverting said modulated signals to IF signals; and a second upconverter for upconverting said IF signals to said RF signals.

6. A circuit as in claim 1, wherein said one of said plurality of modulators includes circuitry that processes said corresponding digital signal with vestigial sideband modulation.

7. In network communication system having a plurality of servers, a receiver that receives a first plurality of digital signals, a transmitter that transmits a first signal in a television channel having a respective subchannel associated with each digital signal, a communication line, coupled between said plurality of servers and said receiver, a plurality of clients that receive digital signals from the plurality of servers, a data recovery device for use in one of said clients, said data recovery device comprising:

a tuner having a tuner input coupled to said television channel, and a tuner output, said tuner tuning to one on said subchannels to generate a second signal on said tuner output;

a downconverter having a downconverter input, coupled to said tuner output, and a dowonverter output, said downconverter downconverting to generate a third signal on said downconverter output, said third signal having an intermediate frequency;

a demodulator having a demodulator input, coupled to said downconverter output, and at demodulator output, said demodulator demodulating to enable recovery of said digital signal associated with said one of said subchannels.

8. A device as in claim 7, wherein one of said subchannels is approximately 2 MHz in bandwidth.

9. A device as in claim 7, wherein a bit rate of one of said digital signals is approximately 10 Mbits/sec.

10. A device as in claim 7, wherein said demodulator comprises a sync detector.

11. A device as in claim 7, wherein said demodulator comprises:

a second downconverter that receives said third signal and downcoverts to generate a baseband signal; and a baseband sampler that processes said baseband signal.

12. In a network communication system including a plurality of servers, and a communication line coupled to said plurality of servers, a system comprising:

a plurality of modulators, coupled to said communication line, said modulators receiving a plurality of digital signals and generating a plurality of modulated signals each associated with a respective one of said digital signals;

a radio frequency upconverter, said upconverter upconverting one of said modulated signals to an RF signal residing in a standard television channel of said shared medium, said RF signal associated with one of a plurality of subchannels of said television channel;

a shared medium coupled to said upconverter;

a plurality of clients coupled to said shared medium;

a plurality of devices, each device associated with a respective one said plurality of clients, each device including a tuner having a tuner input coupled to said television channel, and a tuner output, said tuner tuning to one of said subchannels to generate a second signal on said tuner output;

a downconverter having a downconverter input, coupled to said tuner output, and a downconverter output, said downconverter downconverting to generate a third signal on said downconverter output, said third signal having an intermediate frequency, a demodulator that receives said third signal and demodulates to enable recovery of said digital signal associated with said one of said subchannels.

13. The system as in claim 12, wherein one of said subchannels is approximately 2 MHz in bandwidth.

14. The system as in claim 12, wherein a bit rate of each of said digital signals is approximately 10 Mbits/sec.

15. The system as in claim 12, wherein one of said plurality of modulators includes circuitry that processes said corresponding digital signal with quadrature amplitude modulation.

16. The system as in claim 15, wherein said upconverter comprises:

a first plurality of upconverters for upconverting said modulated signals to IF signals; and a second upconverter for upconverting said IF signals to said RF signals.

17. The system as in claim 12, wherein said one of said plurality of modulators includes circuitry that processes said corresponding digital signal with vestigial sideband modulation.

18. The system as in claim 17, wherein said demodulator comprises a sync detector.

19. The system as in claim 16, wherein said demodulator comprises:

a second downconverter that receives said third signal and downcoverts to generate a baseband signal; and a baseband sampler that processes said baseband signal.

20. The system as in claim 12, further comprising:

a client modulator, said client modulator modulating client data, said client data having a lower bit rate than said respective portion of said digital data;

a client RF upconverter, said client RF upconverter upconverting said modulated client data to a client RF signal residing on a portion of a standard television channel, said client RF signal associated with a subchannel;

an upstream tuner, said upstream tuner tuning to said client RF signal;

an upstream downconverter, said upstream downconverter downconverting said client RF signal to a client IF signal; and an upstream demodulator, said upstream demodulator demodulating said client IF signal and approximately recovering a said client data.

21. The system as in claim 20, wherein said a client RF upconverter places said client RF signal upon said medium and said upstream tuner tunes to said client RF signal upon said medium.

22. In an asymmetric network communication system including a plurality of servers, a communication line coupled to said plurality of servers, and a plurality of second channels for sending a second plurality of digital signals from said clients to said servers, a system comprising:

a plurality of modulators, coupled to said communication line, said modulators receiving a plurality of digital signals and generating a plurality of modulated signals each associated with a respective one of said digital signals;

a radio frequency upconverter, said upconverter upconverting one of said modulated signals to an RF signal residing in a standard television channel of said shared medium, said RF signal associated with one of a plurality of subchannels of said television channel;

a shared medium coupled to said upconverter;

a plurality of clients coupled to said shared medium;

a plurality of devices, each device associated with a respective one said plurality of clients, each device including a tuner having a tuner input coupled to said television channel, and a tuner output, said tuner tuning to one of said subchannels to generate a second signal on said tuner output;

a downconverter having a downconverter input, coupled to said tuner output, and a downconverter output, said downconverter downconverting to generate a third signal on said downconverter output, said third signal having an internediate frequency, a demodulator that receives said third signal and demodulates to enable recovery of said digital signal associated with said one of said subchannels.

23. The system as in claim 22, wherein one of said subchannels is approximately 2 MHz in bandwidth.

24. The system as in claim 22, wherein a bit rate of each of said digital signals is approximately 10 Mbits/sec.

25. The system as in claim 22, wherein one of said plurality of modulators includes circuitry that processes said corresponding digital signal with quadrature amplitude modulation.

26. The system as in claim 25, wherein said upconverter comprises:

a first plurality of upconverters for upconverting said modulated signals to IF signals; and a second upconverter for upconverting said IF signals to said RF signals.

27. The system as in claim 22, wherein said one of said plurality of modulators includes circuitry that processes said corresponding digital signal with vestigial sideband modulation.

28. The system as in claim 27, wherein said demodulator comprises a sync detector.

29. The system as in claim 26, wherein said demodulator comprises:

a second downconverter that receives said third signal and downcoverts to generate a baseband signal; and a baseband sampler that processes said baseband signal.

30. The system as in claim 22, further comprising:

a client modulator, said client modulator modulating client data, said client data having a lower bit rate than said respective portion of said digital data;

a client RF upconverter, said client RF upconverter upconverting said modulated client data to a client RF signal residing on a portion of a standard television channel, said client RF signal associated with a subchannel;

an upstream tuner, said upstream tuner tuning to said client RF signal;

an upstream downconverter, said upstream downconverter downconverting said client RF signal to a client IF signal; and an upstream demodulator, said upstream demodulator demodulating said client IF signal and approximately recovering a said client data.

31. The system as in claim 30, wherein said a client RF upconverter places said client RF signal upon said medium and said upstream tuner tunes to said client RF signal upon said medium.

32. In a high speed asymmetric two way communication system using at least a portion of a television spectrum to convey high speed digital data in a downstream direction to at least one client, and a shared medium for transporting signals to the at least one client a system comprising:

a plurality of modulators, the modulators each modulating a signal contained in a respective portion of the television channel into a plurality of modulated signals;

a radio frequency upconverter associated with a modulator, the upconverter upconverting an associated modulated signal to an RF signal residing in a standard television channel of the shared medium, the RF signal defining a subchannel within the television channel;

a client tuner, the client tuner tuning to one of the RF signals on the shared medium;

a first client downconverter associated with the tuner, the first client downconverter downconverting the one of the RF signals to an IF signal; and a client demodulator, the client demodulator demodulating the IF signal to enable recovery of digital data for conveyance to a client.

33. The system as in claim 32, wherein the subchannel is approximately 2 MHz in bandwidth.

34. The system as in claim 32, wherein a bit rate of each of the respective subchannels is an Ethernet rate of approximately 10 Mbits/sec.

35. The system as in claim 32, wherein the plurality of modulators quadrature amplitude modulate the digital data.

36. The system as in claim 35, wherein the RF upconverter comprises:

a first plurality of upconverters for upconverting the modulated signals to IF signals; and a second upconverter for upconverting the IF signals to the RF signals.

37. The system as in claim 36, wherein the client demodulator comprises:

a second downconverter, the second downconverter downconverting the IF signal to a baseband signal; and a baseband sampler, the baseband sampler recovering the digital data from the baseband signal.

38. The system as in claim 32, further comprising:

a client modulator, the client modulator modulating client data for transmission in an upstream direction, the client data having a lower bit rate than the respective portion of the digital data;

a client RF upconverter, the client RF upconverter upconverting the modulated client data to a client RF signal residing on a portion of a standard television channel, the client RF signal defining a subchannel;

an upstream tuner, the upstream tuner tuning to the client RF signal;

an upstream downconverter, the upstream downconverter downconverting the client RF signal to a client IF signal; and an upstream demodulator, the upstream demodulator demodulating the client IF signal and approximately recovering the client data.

39. The system as in claim 38, wherein the a client RF upconverter places the client RF signal upon the medium and the upstream tuner tunes to the client RF signal upon the medium.

40. The system as in claim 32, wherein the plurality of modulators vestigial sideband modulate the digital data.

41. The system as in claim 40, wherein the client demodulator comprises a sync detector.

42. An asymmetric network communication system comprising:

a plurality of servers;

a circuit including
 a receiver that receives a first plurality of digital signals,
 a transmitter that transmits a first signal on a television channel having subchannels each associated with a respective one of the first plurality of digital signals;

a communication line, coupled between the plurality of servers and the circuit;

a plurality of clients, each including
 a tuner having a tuner input coupled to the television channel, and a tuner output, the tuner tuning to one on the subchannels to generate a second signal on the tuner output,
 a downconverter having a downconverter input, coupled to the tuner output, and a downconverter output, the downconverter downconverting to generate a third signal on the downconverter output, the third signal having an intermediate frequency, and
 a demodulator having a demodulator input, coupled to the downconverter output, and at demodulator output, the demodulator demodulating to enable recovery of the digital signal associated with the one of the subchannels; and a plurality of second channels for sending a second plurality of digital signals from the clients to the servers.

* * * * *